Figure 1:
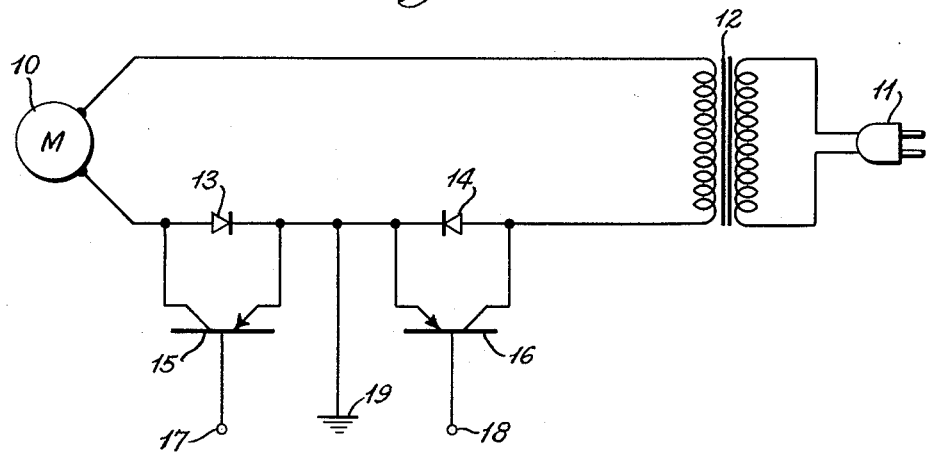

Feb. 20, 1962

E. G. MILLIS 3,022,454

TRANSISTOR DIRECT CURRENT MOTOR CONTROL

Filed Aug. 17, 1956

INVENTOR
Edwin G. Millis

BY Stevens, Davis, Miller & Mosher
ATTORNEYS

United States Patent Office 3,022,454
Patented Feb. 20, 1962

3,022,454
TRANSISTOR DIRECT CURRENT MOTOR
CONTROL
Edwin G. Millis, Dallas, Tex., assignor to Texas Instruments Incorporated, Dallas, Tex., a corporation of Delaware
Filed Aug. 17, 1956, Ser. No. 604,826
4 Claims. (Cl. 318—257)

This invention relates to motor control systems, and more specifically to a transistor circuit which controls both the speed and direction of a small, low power, direct current motor.

It is well known that electrical devices, such as transformers, motors, reactors, magnetic amplifiers, or other devices, that utilize some sort of an iron core, are quite heavy, large, and cumbersome in and of themselves. Many of these devices also require elaborate and complicated control circuits which add to their size and weight. However, if the device in itself is small, it would be quite desirable to avoid all large elaborate control circuitry, if possible, to keep its size and weight at a minimum. Moreover, if the device requires a very small operating current, it would be quite wasteful to employ a control circuit which carries a substantially larger current than that necessary for the operation of the device.

In accordance with this invention, therefore, a control circuit which is comprised of semiconductor devices including diodes and transistors is provided for a low power, direct current motor so that not only the motor operating current can be kept small and the control circuit current substantially smaller, but in addition, the components of the control circuit will add almost negligibly to the size and weight of the device as a whole.

This is accomplished by providing a control circuit comprised of two diodes connected in opposed series relation, in series with an alternating current input to the control circuit and with the control windings of the motor. A transistor is connected in shunt across each diode with the emitter and collector oriented to permit current to flow through the motor control windings in a direction opposite to that permitted by the diode across which the transistor is shunted. Thus the current through one transistor will flow in a direction opposite to that flowing through the other transistor. By appropriately varying the base currents of the transistors, the relative currents flowing through the transistors may be changed, thus causing the net current supplied to the motor to be increased or decreased so as to either increase or decrease the speed of the motor. If the relative transistor currents are changed sufficiently to cause the net current applied to the motor to flow in a direction opposite to the direction in which it had previously been flowing, the direction of rotation of the motor can be reversed.

The transistors may be connected to leave a common grounded element between them and their base leads connected to part of a servomechanism which provides an all electronic control. Or, the transistors may be connected on both sides of the alternating current input with their base leads connected to a tap on a potentiometer which is connected across the input so that a manually operated control can vary the potentiometer tap, and as a result, vary the base currents of the transistors. This will control the emitter to collector currents and, in turn, control both the speed and the direction of rotation of the motor.

Further details and advantages of the transistor direct current motor control system will be apparent from a consideration of the following detailed description when taken in conjunction with the appended drawings which illustrate preferred forms of this invention. It is to be understood, however, that many modifications and changes in detail may be made within the scope of this invention and that the illustration given hereinafter is simply for the purposes of illustration and not limitation.

Figure 2:
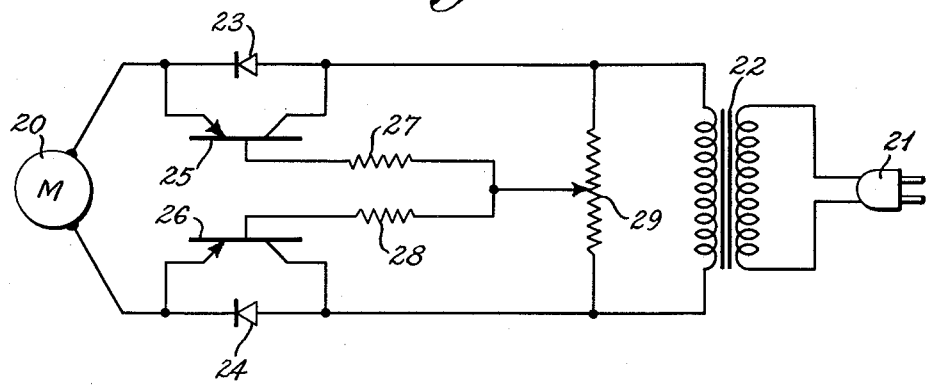

In the appended drawings:

FIGURE 1 is a schematic diagram of the control circuit provided in accordance with this invention; and FIGURE 2 is a schematic diagram of a modified form of the control circuit of this invention.

Referring now to the drawings, and more specifically to FIGURE 1, the current supplied to the control windings of a small D.C. motor 10 is derived from an alternating current power line by means of a plug 11 connected to the primary windings of an input transformer 12. The secondary windings of the input transformer 12 are connected in series with the control windings of the D.C. motor 10 and two diodes 13 and 14 which are connected in opposed relation so as to prevent the flow of current through them and through the control windings of the motor 10. In this case the motor will not run.

Current is permitted to flow if either one or both of the diodes 13 and 14 are shorted out. Thus, if diode 13 is shorted out, current will flow in the control windings of the motor 10 in the direction permitted by diode 14 setting up a magnetic field which causes the motor 10 to rotate in a given direction. On the other hand, if the diode 14 is shorted out, current is allowed to flow in the direction permitted by diode 13 to the control windings of the motor 10 in an opposite direction to that flowing before, and the motor will rotate in a direction opposite to that of before. Furthermore, if both diodes could be shorted out simultaneously, and the magnitudes of the shorting currents could be easily changed, the net current flowing in the control circuit could not only be made to change direction, but could be readily made to change magnitude. As the magnitude of the current in the control circuit changes, the strength of the magnetic field furnished to the armature of the motor 10 is varied and hence the speed of the motor may be regulated.

Diodes 13 and 14 are controlled by transistors 15 and 16 which are connected in parallel with the diodes 13 and 14, with their emitter and collector oriented to permit current flow in the control circuit in the direction opposite to that permitted by the respective diodes 13 and 14 across which the transistors 15 and 16 are shunted. Transistor 15 is shunted across diode 13 to permit current flow in the direction allowed by diode 14, and transistor 16 is shunted across diode 14 to permit current flow in the direction allowed by diode 13. Thus current may flow through diode 14 and transistor 15 to supply the control windings of motor 10 with current in one direction while current may also flow through diode 13 and transistor 16 so as to supply current to the control windings in the opposite direction. The net current flowing through the control windings is thus determined by the relative magnitudes of the above currents and is equal, in fact, to their algebraic sum.

The magnitudes of these currents are, in turn, controlled by the base currents of the transistors 15 and 16. The base terminal of transistor 15, shown at 17, and the base terminal 18 of transistor 16 are shown as open circuits in FIGURE 1. The reason for this showing of an open circuit is that base current control may be afforded by a servomechanism which supplies the necessary current to these terminals. The controlling servomechanism, which is not a part of the present invention, would be required to supply base current of the desired magnitude to the terminals 17 and 18 for a given condition of motor speed and direction of rotation. A common ground element 19 is provided between the transistors 15 and 16 in this circuit arrangement.

A slight modification of the present invention is shown in FIGURE 2. Control current for a D.C. motor 20, exactly like the motor 10 shown in FIGURE 1, is taken from a plug 21 adapted to fit into an alternating current power line which supplies current to the primary windings of an input transformer 22. Diodes 23 and 24 are connected in opposed series relation and in series with the control windings of the motor 20 and the secondary windings of transformer 22. This is the same circuit shown in FIGURE 1 and described before but with one exception. Instead of connecting the diodes adjacent each other to leave a common element between them, the diodes 23 and 24 are now connected with one diode on each side of the transformer 22. A transistor 25 is connected in shunt across diode 23 while transistor 26 is similarly connected in shunt across diode 24. The emitters and collectors of transistors 25 and 26 are oriented to permit a flow of current in the control circuit in a direction opposite to that permitted by the respective diodes 23 and 24 across which the transistors 25 and 26 are shunted. This arrangement serves to short out the diodes 23 and 24 in the same manner as described before with reference to the diodes 13 and 14, and thus regulate the current supplied to the control windings of the motor 20.

However, in the modification shown in FIGURE 2, the lead from the base of transistor 25 is connected through a resistance 27 to a variable tap on a potentiometer 29 which is connected directly across the secondary of input transformer 22. Similarly, the base lead of transistor 26 is connected through a resistance 28 to the same tap on potentiometer 29. The resistances 27 and 28 are preferably of the order of magnitude of 470 ohms, while a potentiometer of 5K ohms has been found desirable for use in this control circuit. With these values, a current of up to one amp may be supplied to the control windings of the direct current motor.

By varying the tap of potentiometer 29, the relative amount of base current supplied to transistors 25 and 26 may be changed. This in turn regulates the amount of current flowing through transistors 25 and 26, and the magnitudes of these currents add algebraically to give a net current flowing through the control windings of the motor 20. If the potentiometer tap is set near the center of potentiometer 29, the currents flowing through each transistor will be approximately equal and the net current will be nearly zero. In this case the speed of the motor will be quite low. On the other hand, if the tap on the potentiometer is set near the upper end, the current flowing through transistor 26 will greatly exceed the current flowing through transistor 25 and hence, the net current in the control windings of the motor 20 will be large and the speed of the motor will be quite high. If the potentiometer tap is set near the lower end of the potentiometer 29, a large current will flow through transistor 25 while only a slight current will flow through transistor 26, and the current in the control windings of the motor 20 will be of a large magnitude and in such direction as to cause the motor 20 to rotate at high speed in a direction opposite to that in which it turned when the potentiometer tap was positioned near the upper end of potentiometer 29.

Thus, a control system for a direct current motor is provided which is most simple in design and small and compact in construction. Moreover, the tap on potentiometer 29 can be connected to some sort of control knob, or lever, the mere setting of which, to various positions, will readily cause the motor to rotate at various speeds in either a forward or reverse direction.

Although the present invention has been shown and described with reference to specific preferred embodiments, nevertheless, numerous modifications and changes obvious to those skilled in the art which do not depart from the spirit of the inventive concepts disclosed herein, are deemed to be within the spirit, scope and contemplation of the invention.

What is claimed is:

1. A control circuit for a direct current motor comprising two unilaterally conductive means connected in opposed series relation in series with the control windings of a direct current motor and an alternating current input to said control circuit, control means connected in shunt across each unilaterally conductive means, said control means comprising a semiconductor device in which a small control current is capable of regulating a larger operating current which flows through said semiconductor device and through said motor control windings, a potentiometer connected across said alternating current input, a variable tap on said potentiometer connected to the control elements in said control means so as to permit an amount of control current to flow in said semiconductor devices in accordance with the position of said potentiometer tap.

2. A control circuit for a direct current motor comprising two diodes connected in opposed series relation in series with the control windings of a direct current motor and an alternating current input to said control circuit, a transistor connected in shunt across each diode with the emitter and collector of the transistor oriented so as to permit current flow in a direction opposite to that permitted by the diode across which the transistor is shunted, a potentiometer connected across said alternating current input, a variable tap on said potentiometer connected to the bases of said transistors so as to permit an amount of base current flow in said transistors in accordance with the position of said potentiometer tap.

3. The combination of a direct current motor, a source of alternating current, and a control circuit connecting the source of alternating current to the direct current motor for controlling current through the motor, said control circuit comprising two unilaterally conductive elements connected in opposed series relation and in series with the control winding of the direct current motor, a unilaterally conductive variable impedance device connected in shunt across each said unilaterally conductive element, each said device oriented to allow current to flow in a direction opposite to the direction of current flow in said element with which it is in shunt, and means for varying the impedance of each said device to control both the speed and direction of said direct current motor.

4. The combination of a direct current motor, a source of alternating current, and a control circuit connecting the source of alternating current to the direct current motor for controlling current through the motor, said control circuit comprising two unilaterally conductive elements connected in opposed series relation and in series with the control winding of the direct current motor, a transistor connected in shunt across each said unilaterally conductive element, said transistor being oriented with respect to its electron emitting electrode and electron collecting electrode to allow current flow in a direction opposite to the direction of current flow in the said element with which it is in shunt, and means for applying a bias to the control electrode of each said transistor to control the current flow through each said transistor and thereby control both the speed and direction of said direct current motor.

References Cited in the file of this patent

UNITED STATES PATENTS

| | | |
|---|---|---|
| 2,397,557 | McCoy | Apr. 2, 1946 |
| 2,698,392 | Herman | Dec. 28, 1954 |
| 2,722,649 | Immel et al. | Nov. 1, 1955 |
| 2,888,622 | Mooers | May 26, 1959 |